(12) United States Patent
Elkins, II et al.

(10) Patent No.: US 7,450,804 B2
(45) Date of Patent: *Nov. 11, 2008

(54) DISTRIBUTION CABLE ASSEMBLY HAVING OVERMOLDED MID-SPAN ACCESS LOCATION

(75) Inventors: Robert B. Elkins, II, Hickory, NC (US); James P. Luther, Hickory, NC (US); Lars K. Nielsen, Denver, NC (US); Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/522,274

(22) Filed: Sep. 15, 2006

(65) Prior Publication Data

US 2007/0009214 A1 Jan. 11, 2007

Related U.S. Application Data

(63) Continuation of application No. 10/852,427, filed on May 24, 2004, now Pat. No. 7,127,143.

(51) Int. Cl.
    *G02B 6/44* (2006.01)
(52) U.S. Cl. ..................... 385/100; 385/109
(58) Field of Classification Search ............ None
     See application file for complete search history.

(56) References Cited

U.S. PATENT DOCUMENTS

| | | | | |
|---|---|---|---|---|
| 4,626,067 A | 12/1986 | Watson | | 350/96.2 |
| 4,884,863 A | 12/1989 | Throckmorton | | 350/96.2 |
| 4,961,623 A | 10/1990 | Midkiff et al. | | 350/96.2 |
| 5,004,315 A | 4/1991 | Miyazaki | | 350/96.15 |
| 5,042,901 A | 8/1991 | Merriken et al. | | 385/135 |
| 5,121,458 A | 6/1992 | Nilsson et al. | | 385/100 |
| 5,125,060 A | 6/1992 | Edmundson | | 385/100 |
| 5,199,095 A | 3/1993 | Iapicco | | 385/100 |
| 5,210,812 A | 5/1993 | Nilsson et al. | | 385/100 |
| 5,440,665 A | 8/1995 | Ray et al. | | 385/135 |
| 5,528,718 A | 6/1996 | Ray et al. | | 385/136 |

(Continued)

FOREIGN PATENT DOCUMENTS

DE 3537684 4/1987

(Continued)

OTHER PUBLICATIONS

Tyco Electronics Raychem Product Sheet, FITS FOSC - Factory Installed Termination System for Fiber Optic Cable Splices, 1990, 2 pages.

(Continued)

*Primary Examiner*—Sung Pak (57) ABSTRACT

A fiber optic cable assembly comprising a first fiber optic cable having pre-selected optical fibers pre-terminated and branched at a cable access point, a second cable optically connected to the pre-terminated optical fibers, and a flexible body encapsulating the cable access point. A method for manufacturing a fiber optic cable assembly comprising providing a fiber optic cable, making an opening in the cable for access, pre-terminating pre-selected optical fibers, optically connecting the pre-selected optical fibers with optical fibers of a tether cable, and encapsulating at least a portion of the cable access location within a flexible overmolded body.

15 Claims, 9 Drawing Sheets

U.S. PATENT DOCUMENTS

| | | | |
|---|---|---|---|
| 5,530,782 A * | 6/1996 | Osaka et al. | 385/45 |
| 5,657,413 A | 8/1997 | Ray et al. | 385/139 |
| 5,778,122 A | 7/1998 | Giebel et al. | 385/55 |
| 5,861,575 A | 1/1999 | Broussard | 174/20 |
| 5,892,870 A | 4/1999 | Fingler et al. | 385/59 |
| RE36,592 E | 2/2000 | Giebel et al. | 385/100 |
| RE37,028 E | 1/2001 | Cooke et al. | 385/112 |
| 6,466,725 B2 | 10/2002 | Battey et al. | 385/126.1 |
| 6,619,697 B2 | 9/2003 | Griffioen et al. | 285/126.1 |
| 6,621,975 B2 | 9/2003 | Laporte et al. | 385/135 |
| 6,810,194 B2 | 10/2004 | Griffiths et al. | 385/135 |
| 7,127,143 B2 * | 10/2006 | Elkins et al. | 385/100 |
| 2005/0111799 A1 | 5/2005 | Cooke et al. | 385/100 |
| 2005/0111800 A1 | 5/2005 | Cooke et al. | 385/100 |
| 2005/0129375 A1 | 6/2005 | Elkins, II et al. | 385/100 |

FOREIGN PATENT DOCUMENTS

| | | |
|---|---|---|
| DE | 3833492 C2 | 4/1990 |
| EP | 0365261 A2 | 4/1990 |
| EP | 0512811 A1 | 11/1992 |
| EP | 1361465 A1 | 11/2003 |
| EP | 0115725 A1 | 12/2003 |
| GB | 2210472 A | 6/1989 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-054204 | 3/1987 |
| JP | 62-54204 | 3/1987 |
| JP | 62-59906 | 3/1987 |
| JP | 63-136007 | 6/1988 |
| JP | 63-180915 | 7/1988 |
| JP | 63-287916 | 12/1988 |
| JP | 63-310317 | 12/1988 |
| JP | 1-138828 | 5/1989 |
| JP | 5-19130 | 1/1993 |
| JP | 2001116968 | 4/2001 |
| WO | WO 2005/119322 A1 | 12/2005 |

OTHER PUBLICATIONS

Patent Cooperation Treaty, International Search Report for PCT/US2007/019762, Mar. 20, 2008, 2 pages.

* cited by examiner

FIG. 9

DISTRIBUTION CABLE ASSEMBLY HAVING OVERMOLDED MID-SPAN ACCESS LOCATION

CROSS-REFERENCE TO RELATED APPLICATIONS

This application is a continuation of U.S. patent application Ser. No. 10/852,427 filed May 24, 2004 now U.S. Pat. No. 7,127,143 by ELKINS et al. and entitled "DISTRIBUTION CABLE ASSEMBLY HAVING OVERMOLDED MID-SPAN ACCESS LOCATION."

BACKGROUND OF THE INVENTION

1. Field of the Invention

The present invention relates generally to a distribution cable deployed in a fiber optic communications network, and more specifically, to a fiber optic distribution cable having a flexible overmolded mid-span access location and a tether for providing access to at least one preterminated optical fiber of the distribution cable.

2. Description of the Related Art

Optical fiber is increasingly being used for a variety of broadband communications including voice, video and data transmissions. As a result of the increasing demand for broadband communications, fiber optic networks typically include a large number of mid-span access locations at which one or more optical fibers are terminated from a distribution cable. These mid-span access locations provide a distribution point from the distribution cable leading to another distribution point, or a drop point from the distribution cable leading to an end user, commonly referred to as a subscriber, thereby extending an "all optical" communications network closer to the subscriber. In this regard, fiber optic networks are being developed that deliver "fiber-to-the-curb" (FTTC), "fiber-to-the-business" (FTTB), "fiber-to-the-home" (FTTH), or "fiber-to-the-premises" (FTTP), referred to generically as "FTTx." Based on the large number of mid-span access locations and the unique demands of optical fibers and optical connections, a distribution cable is needed for routing and protecting optical fibers, and for providing access to terminated optical fibers at numerous mid-span access locations in an FTTx network. A distribution cable is also needed for permitting optical fibers that are accessed and terminated from the distribution cable at mid-span access locations along the length of the distribution cable to be optically connected with optical fibers of one or more fiber optic branch cables or fiber optic drop cables.

In one example of a fiber optic communications network, one or more drop cables are interconnected with a distribution cable at a mid-span access location. Substantial expertise and experience are required to configure the optical connections in the field. In particular, it is often difficult to identify a particular optical fiber of the distribution cable to be optically connected with an optical fiber of a drop cable. Once identified, the optical fiber of the distribution cable is typically joined directly to the optical fiber of the drop cable at the mid-span access location using conventional splicing techniques, such as fusion splicing. In other instances, the optical fiber of the distribution cable and the optical fiber of the drop cable are first spliced to a short length of optical fiber having an optical connector mounted on the other end, which is generally referred to in the art as a "pigtail." The pigtails are then routed to opposite sides of a connector adapter sleeve to interconnect the drop cable with the distribution cable. In either case, the process of configuring the mid-span access location is not only time consuming, but frequently must be accomplished by a highly skilled field technician at significant cost and under field working conditions that are less than ideal. In situations in which a mid-span access location is enclosed within a conventional splice closure, reconfiguring optical connections within the splice closure is especially difficult, based in part on the relatively inaccessible location of the closure, the limited workspace available within the closure, and the inability to readily remove the closure from the distribution cable. Further, once the spliced optical connections are made, it is labor intensive, and therefore relatively costly, to reconfigure the optical connections or to add additional optical connections.

In order to reduce installation costs by permitting less experienced and less skilled technicians to make optical connections and to reconfigure optical connections at mid-span access locations in the field, communications service providers are increasingly pre-engineering new fiber optic networks and demanding factory-prepared interconnection solutions, commonly referred to as "plug-and-play" type systems. There are currently several methods to build a distribution cable assembly for successful deployment and field installation. In one example, the distances between network distribution or termination points are measured with great accuracy and a factory-prepared distribution cable assembly is built with mid-span access locations positioned precisely at the distribution or termination points. However, in this instance the length of the distribution cable between mid-span access locations must be exact, and the deployment of the distribution cable must be performed accurately so that no extra cable length is used between or at the distribution or termination points. If extra length of distribution cable is used, the incorrect placement of even one mid-span access location will have a compounding effect on the position of each downstream mid-span access location. As a result, all downstream mid-span access locations will be out of position and the length of distribution cable will come up short at the end of the cable run. Obviously, measuring the absolute distances between mid-span access locations and building a distribution cable assembly with accurate distances between mid-span access locations is a difficult undertaking. Furthermore, any error in the manufacturing process may result in the entire distribution cable assembly be unusable, and therefore scrapped. In another example of a distribution cable assembly, an excess length of cable (i.e., slack) is intentionally built into the distribution cable at each mid-span access location to insure that the distribution or termination point can always be positioned in the field at exactly the correct location. The obvious drawbacks with such a distribution cable assembly are the cost associated with the excess lengths of cable and the associated need to store the cable slack in an aesthetic and practical manner.

In addition to the problem of manufacturing a distribution cable assembly having the network distribution or termination points in the proper locations, there are also problems encountered with using conventional components to optically connect the optical fibers of the distribution cable with optical fibers of branch cables or drop cables at the mid-span access locations. For example, rigid enclosures are typically used to protect the section of the distribution cable that must be exposed to access the appropriate optical fibers and the splices. Distribution cables provided with conventional enclosures tend to be large in size and inflexible, and thus, unable to satisfy common deployment constraints, such as being wound onto a reel, deployed through conduits having a relatively small inner diameter or significant bends, or deployed through conventional aerial lashing equipment, such as sheaves and rollers. Furthermore, such enclosures are often structurally complex and difficult to install.

Accordingly, there is a specific and unresolved need for a factory-prepared fiber optic distribution cable including at least one mid-span access location for providing access to one or more preterminated optical fibers that has a small enough diameter and is flexible enough to be wound onto a reel, deployed through a conduit having a relatively small inner diameter or significant bends, or deployed using conventional aerial lashing equipment. In addition, there is a specific and unresolved need for a factory-prepared fiber optic distribution cable that does not require a highly skilled field technician or extensive field labor to interconnect optical fibers of the distribution cable with optical fibers of a branch cable or drop cable and to reconfigure the optical connections after the initial installation of the distribution cable. To satisfy these needs, what is needed is a factory-prepared fiber optic distribution cable assembly including at least one relatively small diameter, flexible mid-span access location and a tether attached to the distribution cable at the mid-span access location that provides a short length of cable slack to permit the distribution or termination point to be accurately positioned at the correct location in the fiber optic communications network.

BRIEF SUMMARY OF THE INVENTION

To achieve the foregoing and other objects, and in accordance with the purposes of the invention as embodied and broadly described herein, the present invention provides various embodiments of a fiber optic distribution cable assembly having a predetermined mid-span access location that serves as a "tether attach point," and a respective tether for providing access to at least one preterminated optical fiber of the distribution cable. The distribution cable assembly is manufactured in the factory (i.e., factory-prepared) for a pre-engineered fiber optic communications network and is wound onto a cable reel for deployment in the field. The tether provides a short length of cable slack at each mid-span access location to allow a distribution or termination point to be positioned at a desired location, thereby eliminating the need for absolute accuracy in the engineering of the fiber optic network, the manufacture of the distribution cable assembly, and the deployment of the distribution cable assembly.

In an exemplary embodiment, the present invention provides a factory-prepared fiber optic distribution cable assembly comprising at least one predetermined mid-span access location positioned along the length of a distribution cable, one or more preterminated optical fibers accessed from the at least one mid-span access location, a flexible overmolded body encapsulating the mid-span access location, at least one tether attached to the distribution cable at the mid-span access location by the flexible overmolded body and one or more optical fibers of the tether optically connected to the one or more preterminated optical fibers at their upstream ends. The downstream ends of the one or more optical fibers of the tether are available for interconnecting the corresponding preterminated optical fibers with respective optical fibers of one or more fiber optic branch or drop cables.

The downstream ends of the one or more optical fibers of the tether may be splice-ready or connectorized. The downstream ends may be terminated in any suitable manner, such as, but not limited to, enclosed by a crush-resistant tubing that is overmolded with a flexible encapsulant material, connectorized and routed to respective connector ports in an optical connection terminal, connectorized and positioned within an overmolded multi-port optical connection terminal, routed to respective optical connection nodes that are linked together in an articulated fashion to form a linear chain of optical connection nodes, or routed to a connector port for providing access to the one or more optical fibers of the tether. Preferably, the tether has a length up to about 100 feet, more preferably up to about 25 feet, and most preferably a length of about 12 to about 15 feet.

In another exemplary embodiment, the present invention provides a factory-prepared fiber optic distribution cable assembly for a pre-engineered fiber optic communications network comprising at least one predetermined mid-span access location, one or more preterminated optical fibers accessed from the mid-span access location and protected by a flexible overmolded body, at least one tether secured at the mid-span access location by the flexible overmolded body, one or more optical fibers of the tether optically connected to respective ones of the preterminated optical fibers and a multi-port optical connection terminal connected at the downstream ends of the one or more optical fibers of the tether. The multi-port optical connection terminal may comprise a relatively rigid, re-enterable housing or may be overmolded with a flexible encapsulant material.

In yet another exemplary embodiment, the present invention provides a process for making a fiber optic distribution cable assembly comprising at least one mid-span access location and at least one tether attached to the distribution cable at the mid-span access location. The process comprises removing a section of the sheath of the distribution cable, accessing one or more preselected optical fibers, severing the preselected optical fibers, furcating the preselected optical fibers, splicing the preselected optical fibers to respective optical fibers of a tether, positioning the mid-span access location and at least a portion of the tether within an overmolding tool, and overmolding the mid-span access location and the portion of the tether to securely attach the tether to the distribution cable at the mid-span access location.

In yet another exemplary embodiment, the present invention provides a method of mitigating cable length errors in a pre-engineered fiber optic communications network comprising a factory-prepared fiber optic distribution cable assembly having at least one mid-span access location. The method comprises accessing one or more preselected optical fibers of the distribution cable at the mid-span access location and optically connecting the preselected optical fibers to one or more optical fibers of a tether attached to the distribution cable at the mid-span access location, deploying the distribution cable assembly within the pre-engineered fiber optic communications network and positioning the tether at a desired location in order to compensate for cable length errors in the pre-engineering of the network or the manufacture or deployment of the distribution cable assembly.

In yet another exemplary embodiment, the present invention provides a factory-prepared fiber optic distribution cable assembly comprising at least one predetermined mid-span access location, one or more preterminated optical fibers accessed from the mid-span access location, a flexible overmolded body encapsulating the mid-span access location, at least one tether attached to the distribution cable by the flexible overmolded body, one or more optical fibers of the tether optically connected to the preterminated optical fibers of the distribution cable and a means for interconnecting the one or more optical fibers of the tether with at least one optical fiber of a fiber optic branch cable at a desired distribution point or a fiber optic drop cable at a desired termination point.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the embodiments set forth herein. These exemplary embodiments are provided so that this disclosure will be both thorough and complete, and will fully convey the scope of the invention and enable one of ordinary skill in the art to make, use and practice the invention. Like reference numbers refer to like elements throughout the various drawings.

The fiber optic distribution cable assembly of the present invention comprises at least one predetermined mid-span access location along the cable length for providing access to at least one preterminated optical fiber. In preferred embodiments, the distribution cable assembly comprises a plurality of mid-span access locations at predetermined spaced apart locations along the cable length, thus providing multiple access locations that serve as tether attach points for attaching a tether to the distribution cable. The fiber optic distribution cable assembly may be wound onto a reel for shipping and deployment through a conduit having a relatively small inner diameter or significant bends or through conventional aerial lashing equipment, such as sheaves or rollers. The distribution cable assembly is prepared in a factory, thus eliminating the need for first deploying a fiber optic distribution cable and then performing a mid-span access in the field, for example at a telephone pole or in a network distribution or termination enclosure, such as a closure, pedestal or terminal. The distribution cable assembly of the present invention offers communications service providers with a factory-prepared, low-profile fiber optic distribution cable having mid-span access locations that are protected during cable shipping, deployment and network installation. By eliminating the rigid structure of a conventional enclosure, the mid-span access location length may be increased, preferably up to about 4 feet, and more preferably up to about 3 feet, while maintaining sufficient flexibility to be deployed through conduits having a relatively small diameter or significant bends or through aerial conventional lashing equipment. The longer mid-span access location also makes longer lengths of optical fiber available at each mid-span access location, thereby allowing greater flexibility in the choice of splicing equipment and greater fiber length for any necessary repair or reconfiguration.

In the embodiments illustrated herein, terminated optical fibers accessed from the distribution cable are spliced to optical fibers of a tether having a predetermined length preferably not exceeding about 100 feet, more preferably not exceeding about 25 feet, and most preferably between about 12 feet and about 15 feet. The remaining optical fibers of the distribution cable are managed and routed separately from the terminated optical fibers such that they extend uninterrupted through the distribution cable and are available for terminating at other downstream mid-span access locations. As will be described in detail below, the tether presents the preterminated optical fibers of the distribution cable for interconnection with optical fibers of a fiber optic branch or fiber optic drop cable in an optical communications network in various configurations, including but not limited to, splice-ready optical fibers, pre-connectorized optical fibers and pre-connectorized optical fibers positioned within connector sleeve adapters of optical connection nodes or connector pods. One or more fiber optic branch cables (i.e., extended or secondary distribution cables) or fiber optic drop cables may be routed to the splice-ready optical fibers or connectorized optical fibers of the distribution cable presented on the tether at any time subsequent to the initial deployment of the distribution cable assembly. In all embodiments, the optical interconnection tether may be configured with a variety of connector types, such as but not limited to SC, LC, DC, FC, ST, SC/DC, MT-RJ, MTP, MPO and other like single or multi-fiber ferrules now known or hereafter developed.

In all embodiments shown and described herein, various types of distribution cables may be accommodated, such as monotube, loose tube, central tube, ribbon and the like. One example of a type of distribution cable suitable for use in conjunction with present invention is an ALTOS® dielectric cable available from Corning Cable Systems LLC of Hickory, N.C. The ALTOS® dielectric cable is a lightweight fiber optic cable designed for both buried (conduit) and aerial (lashed) deployments. In another example, the distribution cable is a Standard Single-Tube Ribbon (SST-Ribbon™) cable available from Corning Cable Systems LLC of Hickory, N.C. The SST-Ribbon™ cable contains readily identifiable twelve-fiber ribbons in a gel-filled tube. Regardless, the distribution cable is preferably designed to provide stable performance over a wide range of temperatures and to be compatible with any telecommunications grade optical fiber. As used herein, the term "optical fiber" is intended to include all types of single mode and multi-mode light waveguides, including one or more bare optical fibers, coated optical fibers, loose-tube optical fibers, tight-buffered optical fibers, ribbonized optical fibers or any other expedient for transmitting light signals now known or hereafter developed. In preferred embodiments, the distribution cable is flexible, easy to route and has no preferential bend. In all embodiments shown and described herein, various types of tethers may also be accommodated, such as monotube, loose tube, central tube and ribbon, and the tether may be disposed within another tubular body in a cable assembly.

Figure 1:
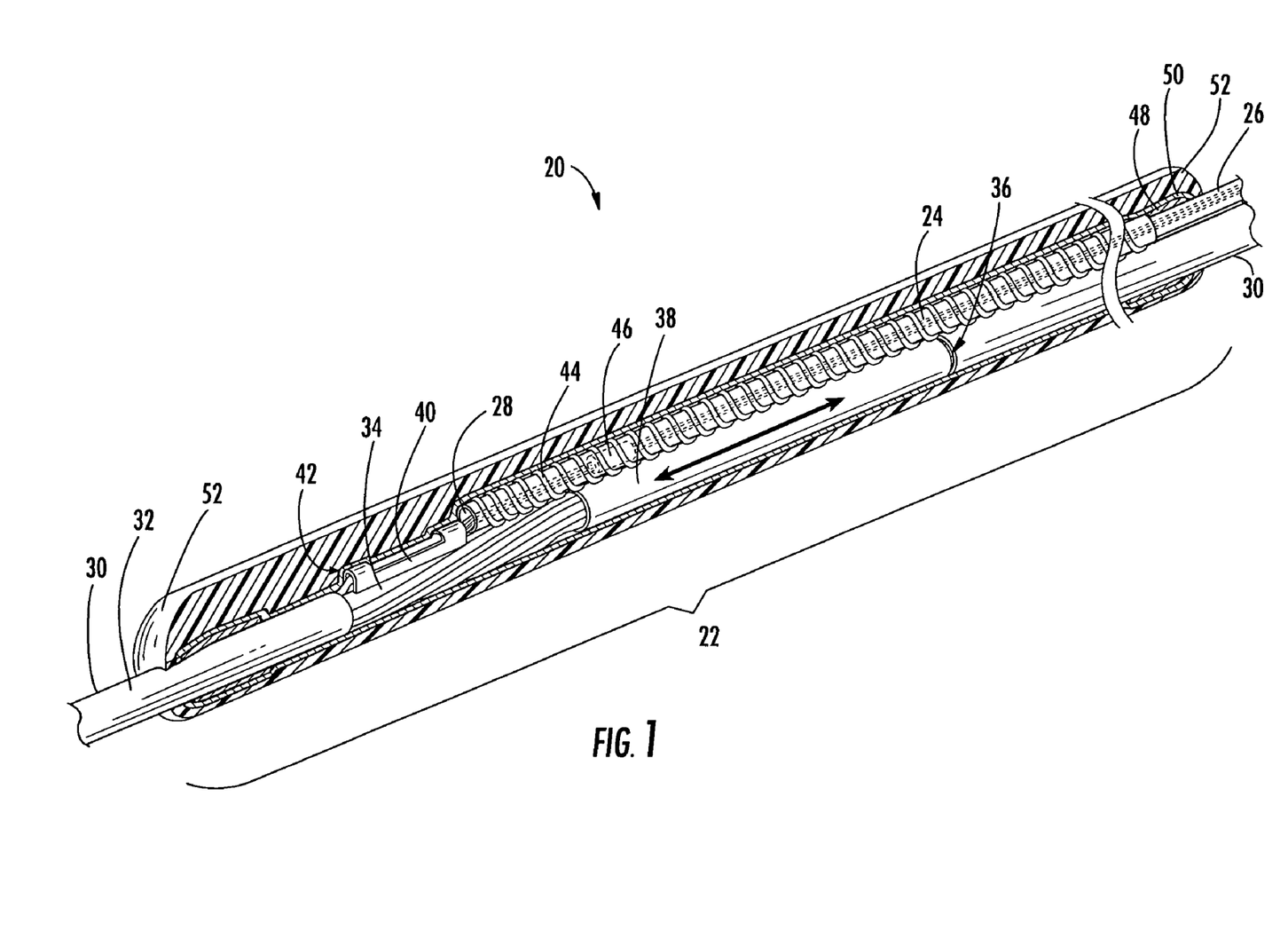
FIG. 1 is a perspective view of a typical mid-span access location that has been prepared in the factory and overmolded with a flexible encapsulant material on a fiber optic distribution cable assembly in accordance with an exemplary embodiment of the present invention.

Referring now to FIG. 1, a distribution cable assembly 20 having a mid-span access location 22 constructed in accordance with an exemplary embodiment of the present invention is shown. The mid-span access location 22 provides a means for optically connecting one or more optical fibers 24 of a tether 26 to one or more optical fibers 28 of a fiber optic distribution cable 30. As used herein, the term "tether" is intended to include fiber optic cable or a tubular body having one or more optical fibers disposed within the tubular body. As is well known and understood in the art, the one or more optical fibers 24 of the tether 26 and the one or more optical fibers 28 of the distribution cable 30 may be spliced together in any conventional manner, such as by fusion or mechanical splicing, either individually or in mass. In an alternative embodiment, the optical fibers 28 of the distribution cable 30 may be optically connected to the optical fibers 24 of the tether 26 with optical connectors mounted upon the ends of the optical fibers 24 (i.e., a "pigtail"). The tether 26 may ultimately be interconnected with a fiber optic branch cable or a fiber optic drop cable containing one or more optical fibers connected to an outside plant optical connection terminal, such as a network interface deice (NID) at a subscriber premises. Thus, the distribution cable assembly 20 provides a tethered distribution point or termination point in a fiber optic network for interconnecting optical fibers of a distribution cable with optical fibers of a branch cable or drop cable.

The mid-span access location 22 is the point at which a single fiber or a subset of optical fibers 28 are preterminated and routed separate from the remaining intact optical fibers of the distribution cable 30. To prepare a mid-span access location 22 in the factory, a section of the sheath 32 of the distribution cable 30 is removed to expose the plurality of buffer tubes 34 within the cable sheath 32. As shown, the buffer tubes 34 are helically wound in a known manner. The exposed length of the distribution cable 30 and the buffer tubes 34 may vary. However, in a preferred embodiment, the length ranges between about 3 and about 36 inches. A ring-cut 36 is then made through the sheath 32 about 5 to 20 inches upstream of the exposed section of buffer tubes 34. By ring cutting the cable sheath 32, a portion 38 becomes slidable along the exposed section of buffer tubes 34 and may remain in place to cover a portion of the exposed buffer tubes 34 once the one or more optical fibers 28 have been severed and the ends removed, referred to in the art as "fished," from their respective buffer tube 34. The exposed length of the buffer tubes 34 allows for about 5 to about 30 inches of optical fiber to be withdrawn from the buffer tube 34 for subsequent splicing, thereby providing sufficient slack fiber length for more than one splice attempt.

For a given mid-span access location 22, the appropriate buffer tube 34 may be accessed in two places using a standard No-Slack Optical Fiber Access Tool (NOFAT) available from Corning Cable Systems LLC of Hickory, N.C. The NOFAT tool is suitable for use in locations in which a limited amount of cable slack can be obtained and the buffer tubes 34 remain helically wrapped around a central member (not shown). The NOFAT tool provides a guide that allows a scalpel to open a buffer tube 34 without cutting completely through the buffer tube 34 or the optical fibers disposed within the buffer tube 34. The NOFAT tool is compatible with standard sizes of buffer tubes 34 utilized in Corning Cable Systems ALTOS® Cable.

Although not shown, two buffer tube access points are cut on the appropriate buffer tube 34. Starting at the downstream access point, a predetermined number of 250 μm optical fibers 28 are accessed and severed. In a buffer tube 34 comprising twelve optical fibers, four or eight optical fibers, for example, may be preterminated. The remaining optical fibers disposed within the buffer tube 34 remain intact and continue through the distribution cable 30. The severed optical fibers 28 are then fished out of the upstream access point cut on the same buffer tube 34, thereby exposing the total optical fiber length of about 5 to 30 inches. The minimum bend radius of the optical fibers 28 is not violated during the process of fishing-out the fibers. After removing the optical fibers 28 from the buffer tube 34, any water-blocking gel (if present within the buffer tube) is cleaned off of the entire length of the exposed optical fibers.

Once the optical fibers 28 have been withdrawn from their respective buffer tube 34, the 250 μm coated optical fibers 28 are fed through and arranged in a buffer tube transition piece 40. The buffer tube transition piece 40 may be rigid or somewhat flexible to permit the buffer tube transition piece 40 to bend slightly to conform to the curvature of the buffer tube 34 or other structure to which it is attached. The buffer tube transition piece 40 is positioned to surround the upstream access point (not shown) and to protect the exposed open portion of the buffer tube 34. In a preferred embodiment, the buffer tube transition piece 40 is snapped over the exposed buffer tube region in a C-shaped groove 42 adjacent the point at which the optical fibers 28 exit the buffer tube 34. Once all of the optical fibers 28 have been routed, a cavity provided in the buffer tube transition piece 40 for receiving the optical fibers 28 may be filled with a sealing material, such as a silicone elastomer or epoxy material, to seal the junction, prevent torque in the transition piece 40 and prevent any water-blocking gel that may be present from leaking out of the buffer tube 34. Although not shown, the downstream exposed access point on the buffer tube 34 may be sealed with a heat deformable material, such as a conventional heat shrink.

The optical fibers 28 of the distribution cable 30 are then spliced, as described above, to the optical fibers 24 of the tether 26. The splice points may be held and protected using one or more splice protectors 46 or heat deformable material. The optical fibers 24 of the tether 26 optically connected to the optical fibers 28 of the distribution cable 30 are then routed through a flexible, yet crush-resistant tubing 44, such as a spirally reinforced tube, in order to protect the unsheathed portion of the optical fibers 28, 24 and to provide a guide channel for the optical fibers 24 to the tether 26. The tubing 44 is axially aligned with the distribution cable 30 to provide a low-profile, minimum diameter mid-span access location, as will be described.

Once the optical fibers 28, 24 of the mid-span access location 22 have been optically connected, a water-blocking wrap 48 and a protective layer 50 for the mid-span access location may be added to the distribution cable assembly 20. The water-blocking wrap 48 is positioned at the ends of the mid-span access location 22 around the distribution cable 30 on one end and around the distribution cable 30 and tether 26 on the opposite end. The protective layer 50 such as, but not limited to, a foil made of tin or aluminum, is used to protect the underlying components of the mid-span access location 22 prior to overmolding the entire length of the mid-span access location 22. Other materials may be used to protect the mid-span access location 22 prior to overmolding, provided that the material is capable of being shaped or formed to the underlying components and the structure of the distribution cable 30 and the tether 26.

The overmolding process involves preparing the sheath 32 of the distribution cable 30 in a manner known in the art, such as by cleaning and roughening, flame preparing or chemically preparing the surface of the sheath 32. The overmolding process involves placing the distribution cable assembly 20 into an overmolding tool, as is described below and shown in FIG. 9, and injecting a flexible, encapsulant material into the cavity defined by the mold. Materials suitable for overmolding include, but are not limited to, polyurethane, silicone and like materials. The overmolded layer or body 52 provides an outer protective shell, maintains sealing integrity and is capable of withstanding crush forces up to at least about 300 lbs. The entire overmolded mid-span access location 22 is preferably up to about 3 feet in length and is sufficiently flexible to permit the distribution cable assembly to be deployed through conduit or through aerial lashing equipment. The degree of flexibility is dependent upon the material chosen and the geometry of the underlying components. For example, the overmolded mid-span access location may have a preferential bend in the same direction as the preferential bend of the underlying distribution cable 30 or tether 26. In an alternative embodiment, a strength member may be added to the distribution cable assembly 20 prior to overmolding in order to force the distribution cable 30 and the tether 26 to bend along a common axis. In another alternative embodiment, the shape of the overmolded body 52 may force the distribution cable assembly 20 to bend along a preferred axis. In all embodiments, the overmolded body 52 may have any desired shape, however, the preferred shape is both low profile and has rounded or tapered ends so as to avoid snagging during deployment of the distribution cable assembly 20 through conduits or aerial lashing equipment.

Still referring to FIG. 1, the tether 26 is securely attached to the distribution cable 30 at the mid-span access location 22 by the overmolded body 52. Alternatively, the tether 26 and the distribution cable 30 may be secured together using a conventional fastener or strap prior to overmolding the mid-span access location 22 in order to provide additional securing. The end of the tether 26 may also be fed into the protective tube 44 in order to further protect the optical fibers 24 of the tether 26.

Figure 2:
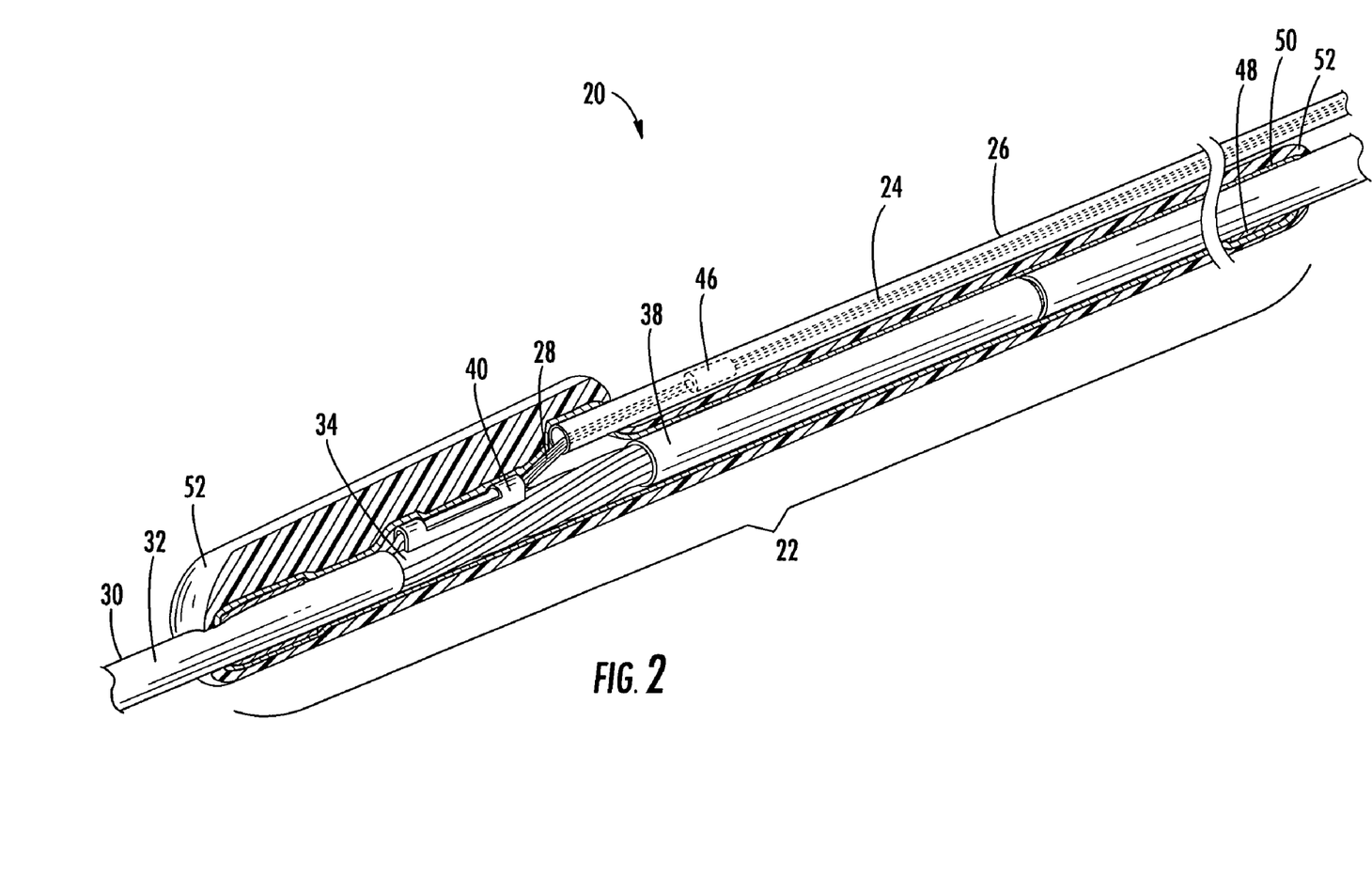
FIG. 2 is a perspective view of a typical mid-span access location that has been prepared in the factory and overmolded with a flexible encapsulant material on a fiber optic distribution cable assembly in accordance with another exemplary embodiment of the present invention.

Referring to FIG. 2, an alternative embodiment of a mid-span access location 22 that has been prepared and overmolded in the factory is shown. In this embodiment, the optical fiber splice points 46 are located within a portion of the tether 26 that has not been overmolded. The mid-span access location 22 provides a means for optically connecting one or more optical fibers 24 of a tether 26 to one or more optical fibers 28 of a fiber optic distribution cable 30. The mid-span access location 22 is the point at which a single optical fiber 28 or a subset of optical fibers 28 is preterminated and furcated. Again, to achieve a mid-span access location 22 in the factory, a section of the sheath 32 of the distribution cable 30 is severed and removed to expose the buffer tubes 34 within the cable sheath 32. A ring-cut 36 is then made through the sheath 32 about 5 to 20 inches upstream of the exposed section of buffer tubes 34. By ring cutting the cable sheath 32, a portion 38 becomes slidable along the exposed section of buffer tubes 34 and may remain in place to cover a portion of the exposed buffer tubes 34 once the one or more optical fibers 28 have been severed and the ends removed, referred to in the art as "fished," from their respective buffer tube 34. The exposed length of the buffer tubes 34 allows for about 5 to about 30 inches of optical fiber to be withdrawn from the buffer tube 34 for subsequent splicing, thereby providing sufficient slack fiber length for more than one splice attempt.

Although not shown, two buffer tube access points are cut on the appropriate buffer tube 34. Starting at the downstream access point, a predetermined number of 250 µm optical fibers 28 are accessed and severed. The remaining optical fibers disposed within the buffer tube 34 remain intact and continue through the distribution cable 30. The severed optical fibers 28 are then fished out of the upstream access point on the same buffer tube 34, exposing a total length of optical fiber of about 5 to about 30 inches. Once the optical fibers 28 have been withdrawn from their respective buffer tube 34, the 250 µm coated optical fibers 28 are fed into and arranged in a buffer tube transition piece 40. Although not shown, the downstream exposed access point on the buffer tube 34 may be sealed with a heat deformable material.

The optical fibers 28 of the distribution cable 30 are then spliced, as described above, to the optical fibers 24 of the tether 26. The splice points may be held and protected using one or more splice protectors 46 or heat deformable material within a portion of the tether 26 that is not subsequently overmolded. By locating the splice points within the tether 26 outside the overmolded body 52, the splice points are accessible after manufacture of the distribution cable assembly 20 by removing a portion of the sheath of the tether 26 without having to remove any portion of the overmolded body 52. In an alternative method of accessing the splice points following assembly, only the portion of the overmolded body 52 attaching the tether 26 to the distribution cable 30 need be removed in order to release the tether 26 and access the splice points from the end of the tether 26.

As in the previous embodiment, once the optical fibers 28, 24 of the mid-span access location 22 have been optically connected, a water-blocking wrap 48 and a protective layer 50 for the mid-span access location may be added to the distribution cable assembly 20. The water-blocking wrap 48 is positioned at the ends of the mid-span access location 22 around the distribution cable 30 on one end and around the distribution cable 30 and the tether 26 on the opposite end. The protective layer 50 such as, but not limited to, a foil made of tin or aluminum, is used to protect the underlying components of the mid-span access location 22 prior to overmolding the entire length of the mid-span access location 22. Other materials may be used to protect the mid-span access location 22 prior to overmolding, provided that the material is capable of being shaped or formed to the underlying components and the structure of the distribution cable 30 and the tether 26.

Figure 3:
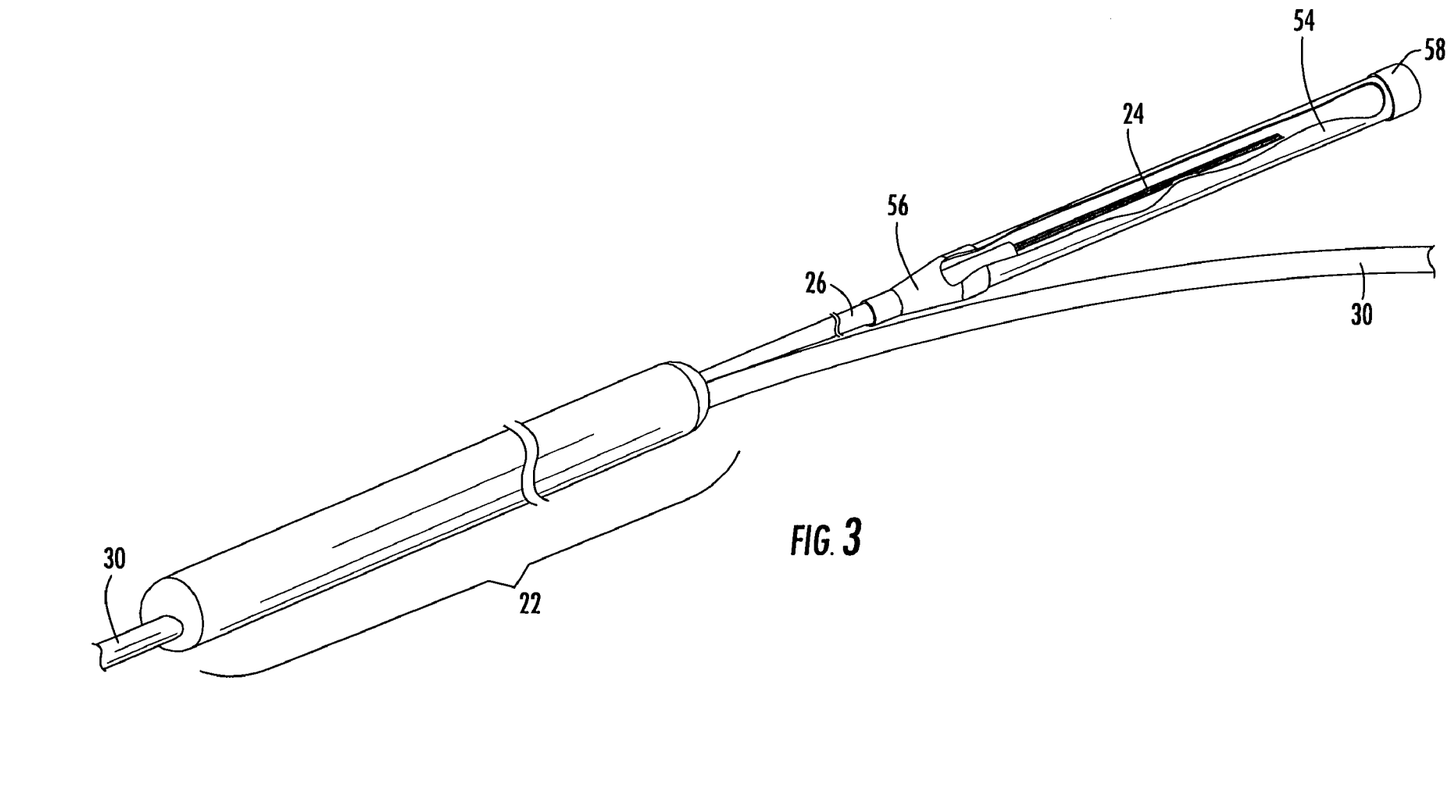
FIG. 3 is a perspective view of the typical mid-span access location of the distribution cable assembly of FIG. 1 having a tether attached to the distribution cable at the mid-span access location that terminates in a plurality of splice-ready optical fibers housed within a crush-resistant tube.

Referring to FIG. 3, a perspective view of a typical mid-span access location 22 having a tether 26 attached to the distribution cable 30 that terminates in a plurality of optical fibers 24 optically connected to the preterminated optical fibers 28 of the distribution cable and housed within a crush resistant tube 54 is shown. As described above, the tether 26 has a predetermined length preferably not exceeding about 100 feet, more preferably not exceeding about 25 feet, and more preferably between about 12 and about 15 feet. The tether 26 ensures that the preterminated optical fibers 28, 24 may be placed in any desired location regardless of the placement of the mid-span access location 22 after deployment. The tether 26 permits the distribution cable assembly 20 to be pre-engineered and manufactured without absolute accuracy in the placement of the mid-span access locations 22. Although not shown, the tether 26 is typically securely attached to the distribution cable 30 via strapping, lashing, clamps or other like fasteners at predetermined intervals along the length of the tether 26. The distribution cable 30 and the tether 26 are lashed together in the factory and wound onto a reel as a complete distribution cable assembly 20. The mid-span access location 22, the distribution cable 30 and the tether 26 are sufficiently flexible so as to permit the distribution cable assembly 20 to be wound onto a cable reel, shipped and deployed through conduit or through conventional aerial lashing equipment. The lashings remain in place during deployment of the distribution cable assembly 20 and may be removed following deployment when the mid-span access location 22 is positioned at a desired location and utilized as a distribution or termination point in the fiber optic communications network.

In the embodiment shown in FIG. 3, the tether 26 terminates in one or more splice-ready optical fibers 24 disposed within a protective tube 54 such that the optical fibers may be dressed and spliced in the field to respective optical fibers of a fiber optic branch cable or a fiber optic drop cable. The protective tube 54 is typically removed and replaced by a conventional outside plant terminal, such as an aerial closure, to house and protect the spliced optical connections. The protective tube 54, preferably designed to withstand expected crush forces, is secured to the tether 26 by a heat deformable material 56, such as conventional heat shrink. The heat deformable material is also operable for providing a smooth transition between the different outer diameters of the sheath of the tether 26 and the protective tube 54, thus aiding deployment through conduit or aerial lashing equipment. An end cap 58 may be used to seal the end of the protective tube 54 and protect the optical fibers 24 from the outside environment.

Figure 4:
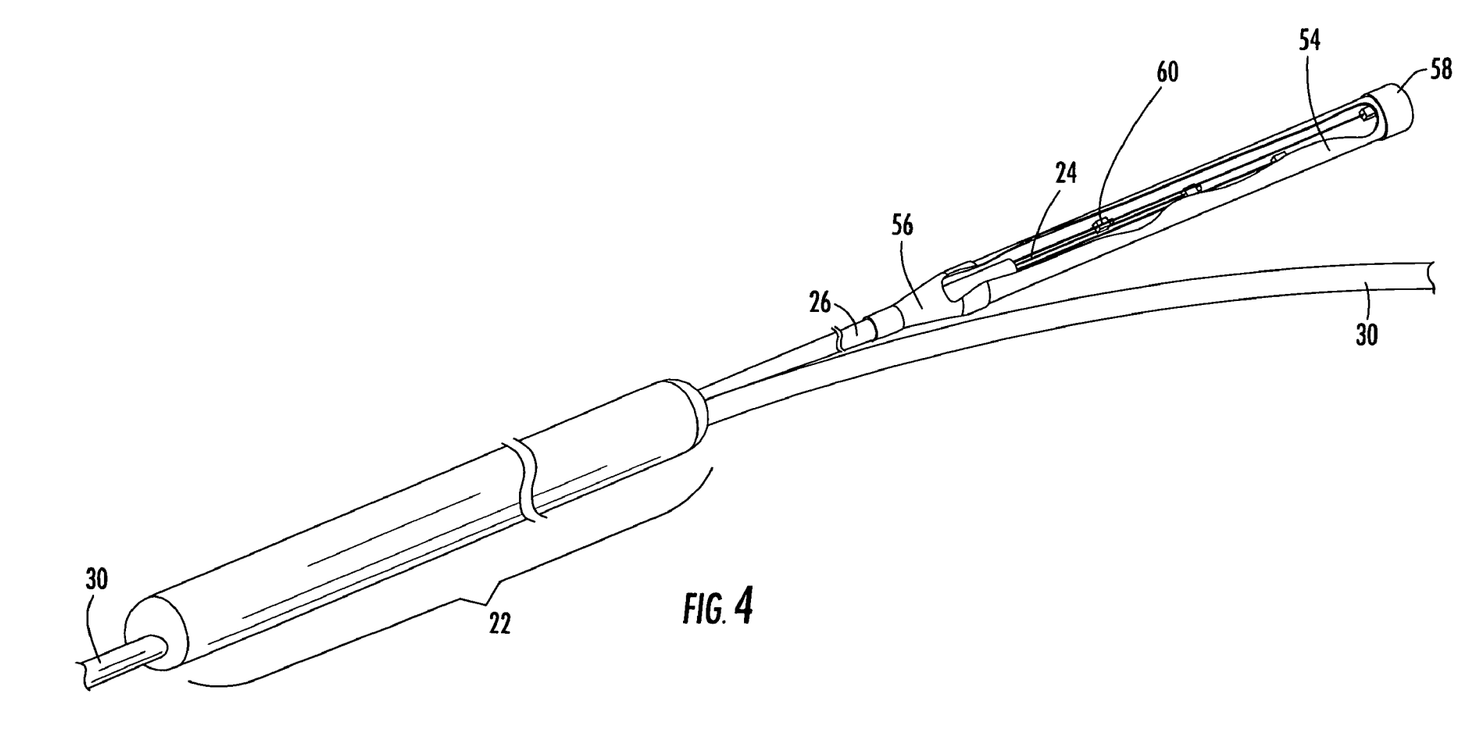
FIG. 4 is a perspective view of the typical mid-span access location of the distribution cable assembly of FIG. 1 having a tether attached to the distribution cable at the mid-span access location that terminates in a plurality of connectorized optical fibers housed within a crush-resistant tube.

Referring to FIG. 4, a perspective view of a typical mid-span access location 22 having a tether 26 attached to the distribution cable 30 that terminates in a plurality of connectorized optical fibers 24 optically connected to the preterminated optical fibers 28 of the distribution cable and housed within a crush resistant tube 54 is shown. As described above, the tether 26 has a predetermined length preferably not exceeding about 100 feet, more preferably not exceeding about 25 feet, and more preferably between about 12 and about 15 feet. The tether 26 ensures that the connectors 60 on the ends of the preterminated optical fibers 28, 24 may be placed in any desired location regardless of the placement of the mid-span access location 22 after deployment. The tether 26 permits the distribution cable assembly 20 to be pre-engineered and manufactured without absolute accuracy in the placement of the mid-span access locations 22. Although not shown, the tether 26 is typically securely attached to the distribution cable 30 via strapping, lashing, clamps or other like fasteners at predetermined intervals along the length of the tether 26. The distribution cable 30 and the tether 26 are lashed together in the factory and wound onto a reel as a complete distribution cable assembly 20. The mid-span access location 22, the distribution cable 30 and the tether 26 are sufficiently flexible so as to permit the distribution cable assembly 20 to be wound onto a cable reel, shipped and deployed through conduit or through conventional aerial lashing equipment. The lashings remain in place during deployment of the distribution cable assembly 20 and may be removed following deployment when the mid-span access location 22 is positioned at a desired location and utilized as a distribution or termination point in the fiber optic communications network. The tether 26 terminates in one or more connectorized optical fibers 24 disposed within the protective tube 54 such that the connectors 60 are readily available for interconnection with a connectorized fiber optic branch or drop cable in the field. Again, the protective tube 54 is secured to the tether 26 by a heat deformable material 56 operable for providing a seal and a smooth transition between the different outer diameters of the sheath of the tether 26 and the protective tube 54. An end cap 58 may also be used to seal the end of the protective tube 54 and thereby protect the optical fibers from the outside environment.

Figure 5:
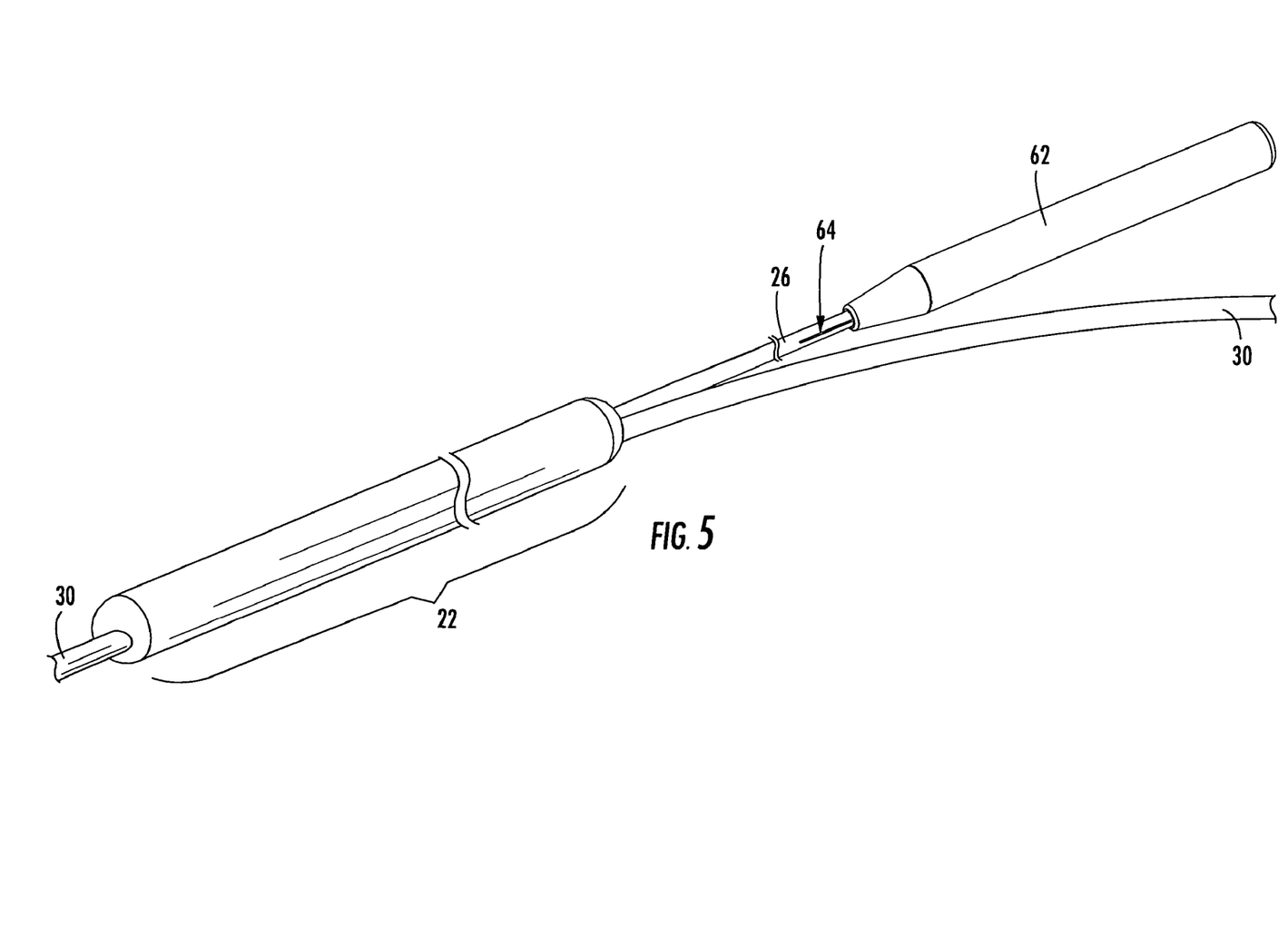
FIG. 5 is a perspective view of the typical mid-span access location of the distribution cable assembly of FIG. 1 having a tether attached to the distribution cable at the mid-span access location that terminates in a flexible overmolded body for protecting the ends of the optical fibers in the tether.

Referring to FIG. 5, the end of the tether 26 opposite the mid-span access location 22 may be overmolded with a flexible encapsulant material 62 in order to protect the splice-ready optical fibers 24 or the connectors 60 shown in the embodiments of FIGS. 3 and 4. At least one ripcord 64 may be disposed underneath the overmolded encapsulant material 62 in order to permit removal of the encapsulant material 62 in the field to access the splice-ready optical fibers 24 or the connectors 60. In another embodiment, two ripcords, spaced about 180 degrees apart, may be disposed underneath the overmolded encapsulant material 62. Regardless, the ripcord 64 is tied to the tether 26 at one of its ends and the opposite end extends outwardly from the overmolded encapsulant material 62. Once the tether 26 is positioned at the desired location, the end of the ripcord 64 outside the tether 26 is pulled in the direction of the tether 26 to remove the encapsulant material 62 and thereby expose the protective tube 54 containing the splice-ready optical fibers 24 or the connectors 60.

Figure 6:
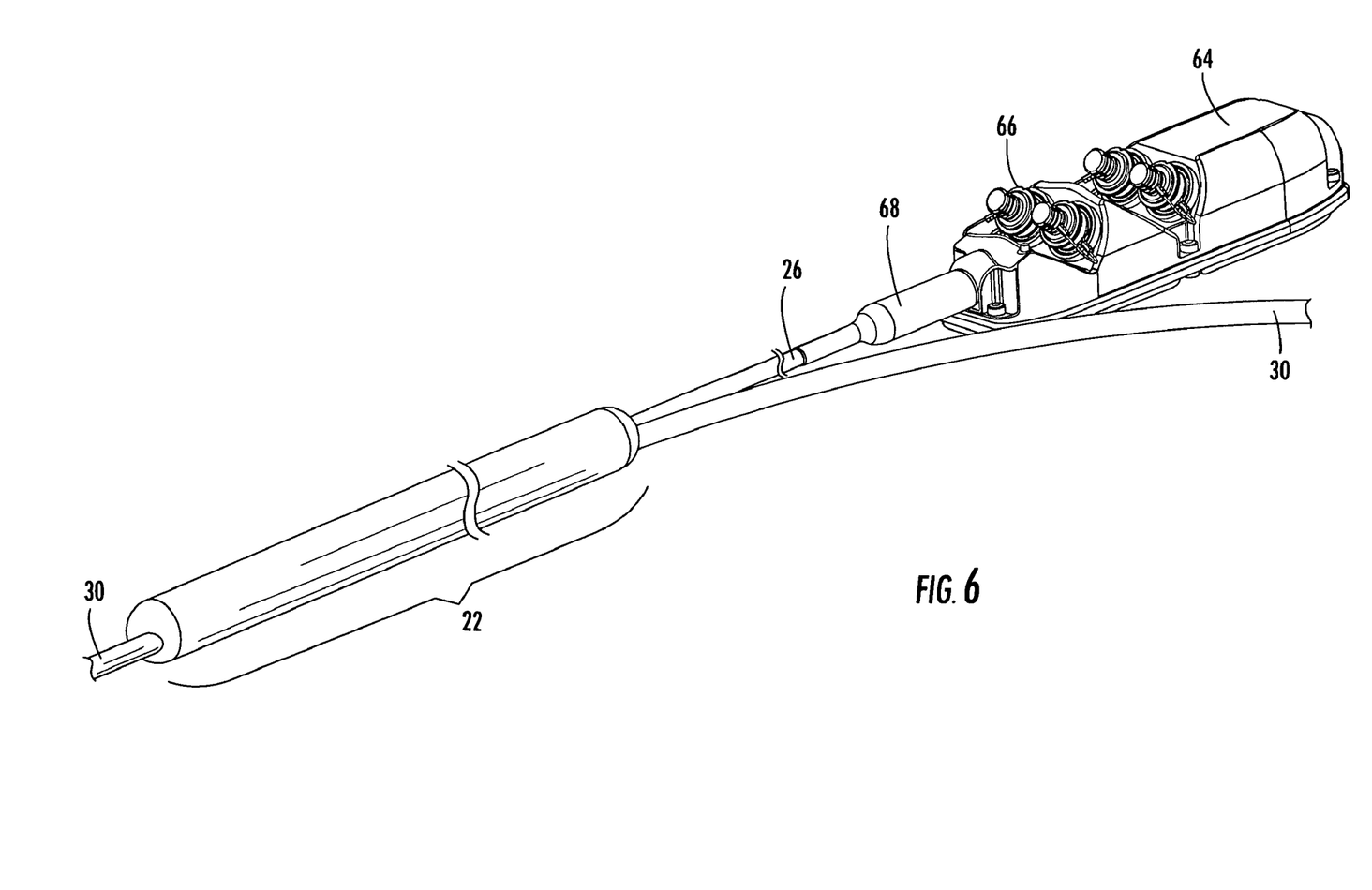
FIG. 6 is a perspective view of the typical mid-span access location of the distribution cable assembly of FIG. 1 having a tether attached to the distribution cable at the mid-span access location that terminates in a multi-port optical connection housing for providing access to one or more pre-connectorized optical fibers of the distribution cable at connector ports.

Referring to FIG. 6, a perspective view of another typical mid-span access location 22 having a tether 26 attached to the distribution cable 30 is shown. In this embodiment, the tether 26 terminates in a multi-port optical connection terminal 64 that provides access to one or more preterminated, and preferably pre-connectorized, optical fibers optically connected to the preterminated optical fibers 28 of the distribution cable 30. The multi-port optical connection terminal 64 may be used to readily interconnect optical fibers of one or more connectorized fiber optic branch or drop cables with the preterminated optical fibers 28 of the fiber optic distribution cable 30 at a desired location in a fiber optic communications network. In various embodiments, the multi-port optical connection terminal 64 may be connected to one or more drop cables extending from a downstream location, such as a subscriber premises, an aerial location, a pedestal or a buried location. The multi-port optical connection terminal 64 allows a field technician to readily connect, disconnect or reconfigure one or more drop cables extending to subscriber premises without disturbing the remaining branch or drop cables.

The multi-port optical connection terminal 64 comprises a base and a cover, with each preferably made of a lightweight and rigid material, such as aluminum or plastic. The embodiment shown in FIG. 6 comprises four optical connection nodes 66 for interconnecting preterminated optical fibers 28 of the distribution cable 30 to multiple branch or drop cables. In one embodiment, each optical connection node 66 comprises an opening for accessing the splice-ready optical fibers 24 of the tether 26. In another embodiment, each optical connection node 66 is a connector port operable for receiving one or more preterminated optical fibers 24 of the tether 26 on the inside of the connector port and a connectorized fiber optic branch or drop cable on the outside of the connector port. As used herein, the term "optical connection node" is intended to broadly include an opening through which the optical fibers 24 (splice-ready or connectorized) of the tether 26 are optically connected to the optical fibers of a branch or drop cable. In various embodiments, the optical connection node 66 may also include a factory-installed connector adapter sleeve (not shown) for aligning and maintaining mating connectors in opposing physical contact. Preferably, the optical connection node 66 further provides an environmental seal at the optical connection between the optical fibers 24 of the tether 26 and the branch or drop cable. The optical connection node 66 may also serve to transfer any tension load on the cables to the housing of the multi-port optical connection terminal 64. While four optical connection nodes 66 are shown, it is envisioned that the multi-port connection terminal 64 may have any size or shape suitable for holding one or more optical connector nodes 66. In addition, the multi-port optical connection terminal 64 defines a cable port operable for receiving the tether 26. A heat deformable material 68 may be used to provide a seal and a smooth transition between the different outer diameters of the tether 26 and the cable port of the multi-port optical connection terminal 64.

Figure 7:
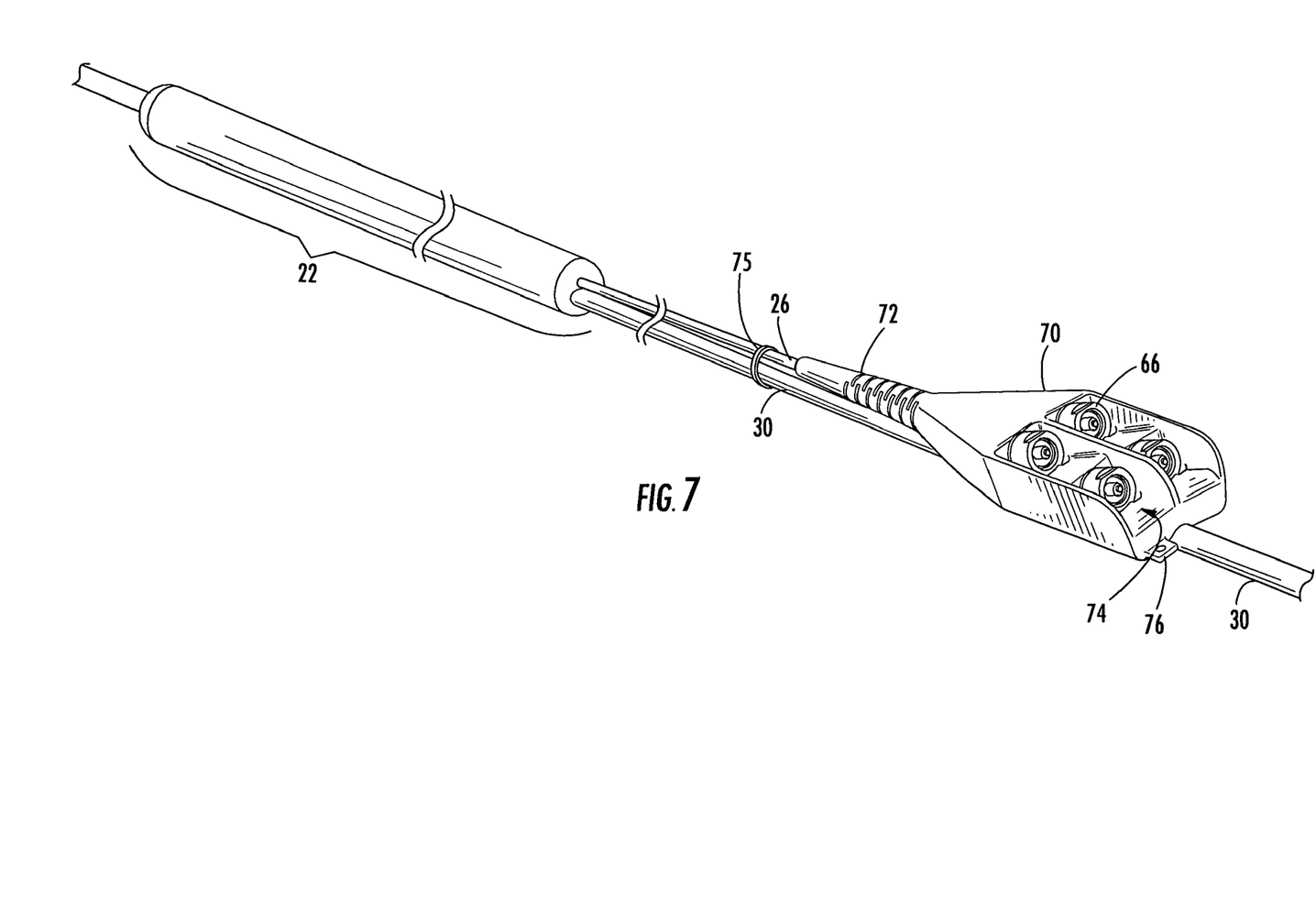
FIG. 7 is a perspective view of the typical mid-span access location of the distribution cable assembly of FIG. 1 having a tether attached to the distribution cable at the mid-span access location that terminates in an overmolded multi-port optical connection terminal for providing access to one or more pre-connectorized optical fibers of the distribution cable at connector ports.

Referring to FIG. 7, a perspective view of another typical mid-span access location 22 having a tether 26 attached to the distribution cable 30 that terminates in an overmolded multi-port optical connection terminal 70 is shown. In this embodiment, the overmolded optical connection terminal 70 provides access to one or more preterminated, and preferably pre-connectorized, optical fibers optically connected to the preterminated optical fibers 28 of the distribution cable 30. The overmolded optical connection terminal 70 may be used to readily interconnect optical fibers of one or more connectorized fiber optic branch or drop cables with the preterminated optical fibers 28 of the fiber optic distribution cable 30 at a desired location in a fiber optic communications network. In various embodiments, the overmolded optical connection terminal 70 may be connected to one or more drop cables extending from a downstream location, such as a subscriber premises, an aerial location, a pedestal or a buried location. The overmolded optical connection terminal 70 allows a field technician to readily connect, disconnect or reconfigure one or more drop cables extending to subscriber premises without disturbing the remaining branch or drop cables. The tethered overmolded optical connection terminal 70 is preferably lashed to the distribution cable 30 using fasteners 75 at intervals along the length of the tether 26. The overmolded optical connection terminal 70 may be routed separately from the distribution cable 30 following deployment of the distribution cable assembly 20 to a desired location in the fiber optic communications network in order to compensate for cable length errors in the placement of the mid-span access location 22.

As shown, the overmolded optical connection terminal 70 comprises four optical connection nodes 66 for providing access to multiple optical fibers. However, the overmolded optical connection terminal 70 may have any shape and may define any number of optical connection nodes 66 comprising, for example, a linear arrangement of four optical connection nodes 66. In one embodiment, the optical fibers 24 of the tether 26 may be connectorized and connected to receptacles, such as connector adapter sleeves, retained within the optical connection nodes 66, as described above. The overmolded structure defines a neck portion 72 that allows for additional flexibility during winding, shipping and deployment, and a groove may be formed on the underside of the overmolded structure for receiving the distribution cable 30 to provide a low profile configuration for deployment through conduit and through aerial lashing equipment. The overmolded structure also defines recesses 74 that protect the optical connection nodes 66 and in particular, connector ports positioned within the optical connection nodes 66, from damage caused by impact. An overmolded tab 76 may be used both as a pulling grip and as a feature for securing the overmolded optical connection terminal 70 in a desired location following deployment of the distribution cable assembly 20.

Figure 8:
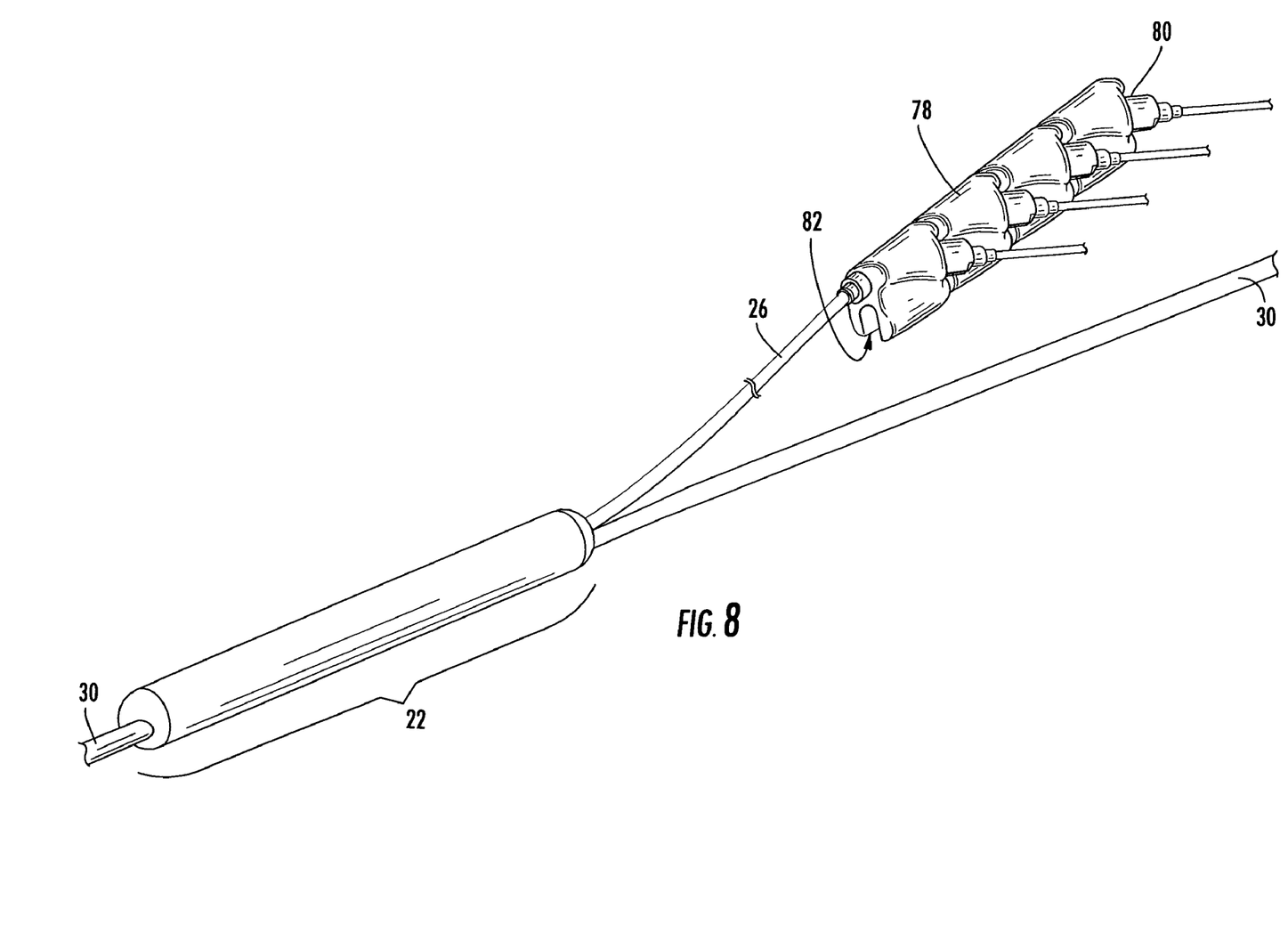
FIG. 8 is a perspective view of the typical mid-span access location of the distribution cable assembly of FIG. 1 having a tether attached to the distribution cable at the mid-span access location that terminates in an articulated chain of optical connection nodes for providing access to one or more pre-connectorized optical fibers of the distribution cable at connector ports.

Referring to FIG. 8, a perspective view of another typical mid-span access location 22 having a tether 26 attached to the distribution cable 30 that terminates in a linear chain of articulated optical connection nodes 78 is shown. Each individual optical connector node 78 comprises a housing that may be secured around or to the distribution cable 30 positioned within groove 82 defined by the housings of the optical connection nodes 78. The structural design of the chain of optical connection nodes 78 minimizes protruding surfaces that may snag the tether 26 when pulled in either direction. The tether 26 and the chain of optical connection nodes 78 is secured to the distribution cable 30 during winding, shipping and deployment using fasteners (not shown) such as, but not limited to lashings, clamps, straps or other like fasteners. The fasteners are removed after the distribution cable assembly 20 is deployed in order to route the tether 26 separately from the distribution cable 30 to a desirable location in the fiber optic communication network. Thus, the tether 26 provides a positionable distribution or termination point. Each optical connection node 78 defines a hardened housing for providing access to at least one optical fiber 24 of the tether 26 optically connected with a respective optical fiber 28 of the distribution cable 30. In one embodiment, each optical connection node 78 is configured with a connector port having a connector adapter sleeve for receiving a connectorized optical fiber 24 from the inside of the optical connection node 78 and a connectorized fiber optic branch or drop cable from the outside of the optical connection node 78. In order to meet deployment requirements, such as axial pull strength, it is preferred that the housing of the optical connection node 78 have material properties similar to that of steel, aluminum, brass, hard plastics or like materials capable of withstanding axial pulling forces of up to about 600 lbs. The housing is preferably made of a flame, impact and UV-resistant material designed to provide security for the optical fibers 24 and to protect the splice-ready optical fibers 24 or connectors 60 in an aerial or buried environment. In addition, the housing may be molded from resins designed to resist environmental degradation.

Each individual optical connection node 78 comprises openings for receiving either the tether 26 or a hollow connecting link (not shown), depending upon the placement of the optical connection node 78 within the linear chain. For example, the most upstream optical connection node 78 receives the tether 26 on one end, and a hollow connecting link on the other end. The second optical connection node 78 in the linear chain receives hollow connecting links on both ends. The hollow connecting links are used to build a linear chain of articulated optical connection nodes 78, and are hollow in order to route the splice-ready optical fibers 24 or connectors 60 through the linear chain to their respective optical connection node 78. The hollow connecting links are preferably rigid, but define wedge-shaped features (not shown) for angular articulation between adjacent optical connection nodes 78, thus providing the linear chain with flexibility during winding, shipping and deployment through conduit or aerial lashing equipment.

Optical fibers 24 of the tether 26 are routed to their respective optical connection node 78, where they may remain as unconnectorized (splice-ready) optical fibers or may be connectorized and routed into an adapter of a connector port. The four optical connection nodes 78 in FIG. 8 are shown optically connected to four connectorized fiber optic branch or drop cables 80. Although four optical connection nodes 78 are shown for interconnecting up to four connectorized branch or drop cables, it is envisioned that the linear chain of optical connection nodes 78 may be lengthened to accommodate any number of connectorized branch or drop cables. Typically, however, the linear chain is configured with no less than four and no more than twelve optical connection nodes 78. Thus, it is conceivable that a distribution cable assembly 20 according to the present invention may accommodate any number of connectorized branch or drop cables, for example, one, two, three, four, six, eight, twelve, etc. Vacant connector ports may be occupied with protective caps that function as both dust caps and to provide a relatively smooth exterior surface in order to reduce the likelihood of snag during deployment. In an alternative embodiment, the entire linear chain of optical connection nodes 78 may be temporarily covered with a mesh or flexible encapsulant material (e.g., overmolded) for deployments in which the distribution cable assembly 20 must be pulled through a conduit having a relatively small inner diameter or significant bends, or through conventional aerial lashing equipment, such as sheaves and rollers.

The structural relationship between the tether 26 and the hollow connecting links forms a relatively stiff, but articulated axis. When deploying the distribution cable assembly 20, the linear chain of articulated optical connection nodes 78 will automatically assume an orientation that allows the distribution cable assembly 20 to be pulled through conduit or aerial lashing equipment. The length of the hollow connecting links protects the optical fibers from excess tension. In a preferred embodiment, the node-to-node articulation angle is preferably at least about 15 degrees, more preferably at least about 20 degrees, and even more preferably at least about 45 degrees. A node-to-node articulation of this magnitude is required to route the distribution cable assembly 20 around about a 9-inch radius. The angular articulation provided by the hollow connecting links is accomplished by wedge-shaped features defined by the connecting links that also limits the movement of the optical connection nodes 78 in the inward direction.

Figure 9:
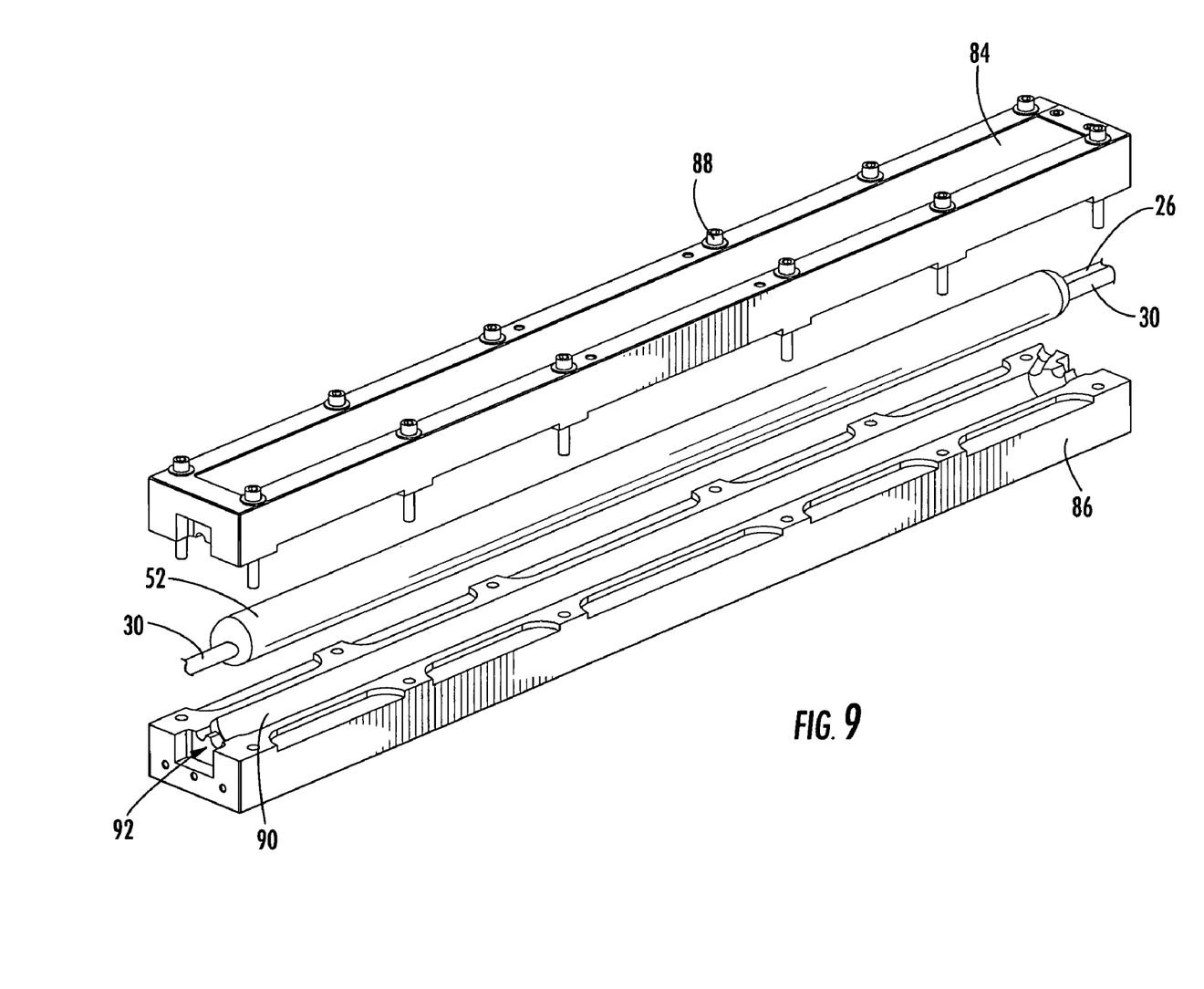
FIG. 9 is a perspective view of a conventional tool used to overmold the typical mid-span access location of the distribution cable assembly of FIG. 1 with a flexible encapsulant material to protect and seal the mid-span access location.

Referring now to FIG. 9, a tool for overmolding a typical mid-span access location 22, including the portion of the tether 26 attached to the distribution cable 30, is shown. The overmolding tool comprises two halves 84 and 86 that clamp together around the mid-span access location 22 of the distribution cable assembly 20 to define a cavity that is injected with a flexible encapsulant material, also referred to herein as the overmolding material 52. The two halves 84, 86 may be secured together using suitable fasteners 88, such as screws or bolts. The overmolding tool further defines features 92 for receiving the distribution cable 30 and the tether 26 and holding the distribution cable assembly 20 in position during material injection and curing. It is important that the distribution cable assembly 20 be held in the proper position during material injection and curing so that the resulting thickness of the overmolding material 52 all the way around will be sufficient to avoid fracture during flexing. The overmolding tool further comprises at least one inlet and one outlet for injecting the overmolding material 52. The overmolding material 52 encapsulates the cable assembly 20 by filling in all air spaces between the malleable wrap 50 and the walls of the interior cavity. In embodiments in which a malleable wrap 50 is not used, the overmolding material 52 fills in all voids. As stated above, the overmolding material 52 may include any encapsulant material capable of providing a protective shell while still maintaining desired flexibility of the mid-span access location 22.

The exemplary embodiments of a distribution cable assembly 20 comprising a flexible mid-span access location 22 having a tether 26 attached to the distribution cable 30 according to the present invention shown and described herein provide a number of significant advantages over previously known closures and distribution points. The distribution cable assembly 20 provides the ability to roughly locate a plurality of mid-span access locations 22 at distribution or termination points in an optical communications network, while ensuring that the mid-span access locations 22 can be placed precisely at the desired locations using the flexible tether 26. By providing factory-prepared tethers 26 having lengths up to about 100 feet, the distribution cable assembly 20 of the present invention further provides the ability to extend the optical communications network laterally from the main distribution cable 30. By preterminating the appropriate optical fibers 28 of the distribution cable 30 and overmolding the mid-span access location 22 in the factory, field labor is reduced while maintaining installation flexibility. The distribution cable assembly 20 may be wound onto a cable reel, shipped and deployed in a buried network through conduit having a relatively small inner diameter or significant bends or deployed in an aerial network through conventional aerial lashing equipment such as sheaves and rollers.

In addition to the advantages described above, a distribution cable assembly 20 constructed in accordance with the present invention provides a field technician with the ability to readily connect, disconnect and reconfigure optical connections at a convenient distribution or termination point regardless of the position of the corresponding mid-span access location 22. In several of the embodiments described above, connectorized fiber optic branch or drop may be readily connected to "quick connect" adapters located within a structure, such as a multi-port optical connection terminal, provided at the end of the tether 26. Thus, in all embodiments, a field technician is not required to enter the mid-span access location 22 in order to make subsequent optical connections to the preterminated optical fibers 28 of the distribution cable 30.

The foregoing is a description of various embodiments of the invention that are given here by way of example only. Although distribution cable assemblies having flexible mid-span access locations and tethers have been described with reference to preferred embodiments and examples thereof, other embodiments and examples may perform similar functions and/or achieve similar results. All such equivalent embodiments and examples are within the spirit and scope of the present invention and are intended to be covered by the appended claims.

The invention claimed is:

1. A fiber optic cable assembly, comprising:
   a first fiber optic cable including a plurality of optical fibers therein, with at least one optical fiber of the plurality of optical fibers being pre-terminated and branched from the plurality of optical fibers at a cable access point;
   a second fiber optic cable including at least one optical fiber therein that is optically connected to the at least one pre-terminated optical fiber; and
   a flexible body encapsulating the cable access point.

2. The cable assembly of claim 1, wherein the flexible body further encapsulates at least a portion of the second fiber optic cable.

3. The cable assembly of claim 1, wherein the second fiber optic cable is a tether and terminates in an optical connection terminal.

4. The cable assembly of claim 1, wherein the second fiber optic cable is a tether and terminates in at least one multi-fiber connector.

5. A method for manufacturing a fiber optic cable assembly, comprising:
   providing a fiber optic cable, having a plurality of optical fibers and a protective covering;
   making an opening in the protective covering at an access location to access the plurality of optical fibers;
   selecting at least one of the plurality of optical fibers of the fiber optic cable;
   terminating the selected at least one of the plurality of optical fibers of the fiber optic cable;
   routing the terminated at least one of the plurality of optical fibers through the opening at the access location;
   optically connecting the at least one terminated optical fiber to at least one optical fiber of a second fiber optic cable; and
   encapsulating at least a portion of the access location within a flexible overmolded body.

6. The method for manufacturing the cable assembly of claim 5, further comprising encapsulating at least a portion of the second fiber optic cable within the flexible overmolded body.

7. The method for manufacturing the cable assembly of claim 5, further comprising:
   splicing the at least one terminated optical fiber to the at least one optical fiber of the second optical fiber cable at one or more splice points; and
   encapsulating the at least one splice point within the flexible overmolded body.

8. The method for manufacturing the cable assembly of claim 5, wherein the plurality of optical fibers of the first fiber optic cable are ribbonized optical fibers.

9. A method for manufacturing a fiber optic distribution cable assembly comprising a distribution cable having a plurality of cable optical fibers disposed within a sheath and at least one mid-span access location and a tether having at least one tether optical fiber and a first end attached to the distribution cable at the mid-span access location, comprising:
   removing a portion of the sheath of the distribution cable at the mid-span access location;
   accessing at least one of the plurality of cable optical fibers through the portion of removed sheath;
   terminating the at least one accessed cable optical fiber;
   optically connecting the at least one terminated cable optical fiber with the at least one tether optical fiber; and
   encapsulating the at least one mid-span access location and a portion of the tether with a flexible overmolded body.

10. The cable assembly of claim 1, wherein the at least one optical fiber from the first fiber optic cable and the at least one optical fiber from the second fiber optic cable are optically connected at at least one splice point.

11. The cable assembly of claim 10, wherein the at least one splice point is located outside of the flexible body.

12. The cable assembly of claim 10, further including at least one splice protector operably arranged at the at least one splice point.

13. The method for manufacturing a fiber optic distribution cable assembly of claim 9, wherein optically connecting the at least one terminated cable optical fiber includes forming at least one splice point.

14. The method for manufacturing a fiber optic distribution cable assembly of claim 9, including:
   reeling and/or installing the assembly; and
   maintaining the distribution cable with the tether during said reeling and/or installing.

15. The method for manufacturing a fiber optic distribution cable assembly of claim 14, including:
   installing the assembly; and
   routing the tether separate from the distribution cable subsequent to said installing.

* * * * *